US012771950B2

(12) United States Patent
Nie

(10) Patent No.: US 12,771,950 B2
(45) Date of Patent: Oct. 20, 2026

(54) PREVIEW IMAGE PROCESSING CIRCUIT, IMAGE PROCESSING METHOD, ELECTRONIC DEVICE, AND NON-TRANSITORY READABLE STORAGE MEDIUM

(71) Applicant: VIVO MOBILE COMMUNICATION CO., LTD., Dongguan (CN)

(72) Inventor: Chaoxian Nie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 217 days.

(21) Appl. No.: 18/756,316

(22) Filed: Jun. 27, 2024

(65) Prior Publication Data

US 2024/0357244 A1 Oct. 24, 2024

Related U.S. Application Data

(63) Continuation of application No. PCT/CN2022/142852, filed on Dec. 28, 2022.

(30) Foreign Application Priority Data

Dec. 28, 2021 (CN) ......................... 202111638522.0

(51) Int. Cl.
*H04N 23/80* (2023.01)
*H04N 23/62* (2023.01)
*H04N 23/63* (2023.01)

(52) U.S. Cl.
CPC ............. *H04N 23/80* (2023.01); *H04N 23/62* (2023.01); *H04N 23/632* (2023.01)

(58) Field of Classification Search
CPC ...... H04N 23/80; H04N 23/62; H04N 23/632; H04N 23/65; H04N 5/2625; H04N 5/2622
See application file for complete search history.

(56) References Cited

U.S. PATENT DOCUMENTS

2012/0127335 A1* 5/2012 Imai ..................... H04N 23/633 348/E9.051
2013/0176460 A1 7/2013 Nakashima
(Continued)

FOREIGN PATENT DOCUMENTS

CN 104980644 A 10/2015
CN 110798630 A 2/2020
(Continued)

*Primary Examiner* — Hung H Lam
(74) *Attorney, Agent, or Firm* — The Webb Law Firm

(57) ABSTRACT

An image processing circuit includes a main control chip and an image processing chip connected to the main control chip. The main control chip is configured to in a case that a display screen receives a first input for a first preview image, obtain a second preview image, and send the second preview image to the image processing chip. The image processing chip is configured to generate a frame interpolation preview image based on the first preview image and the second preview image. The image processing chip is further configured to sequentially output the frame interpolation preview image and the second preview image to the display screen for display; or send the frame interpolation preview image and the second preview image to the main control chip, so that the main control chip sequentially outputs the frame interpolation preview image and the second preview image to the display screen for display.

17 Claims, 4 Drawing Sheets

(56) References Cited

U.S. PATENT DOCUMENTS

| | | | | |
|---|---|---|---|---|
| 2017/0230585 | A1 * | 8/2017 | Nash | H04N 23/69 |
| 2019/0138259 | A1 * | 5/2019 | Bagaria | G06F 3/1454 |
| 2019/0174054 | A1 | 6/2019 | Srivastava et al. | |
| 2020/0137372 | A1 * | 4/2020 | Park | H04N 23/631 |
| 2020/0177797 | A1 | 6/2020 | Liu et al. | |
| 2022/0262012 | A1 | 8/2022 | Li et al. | |
| 2022/0360736 | A1 | 11/2022 | Hu et al. | |

FOREIGN PATENT DOCUMENTS

| | | | |
|---|---|---|---|
| CN | 110874128 | A | 3/2020 |
| CN | 110933497 | A | 3/2020 |
| CN | 111107427 | A | 5/2020 |
| CN | 111225150 | A | 6/2020 |
| CN | 112866576 | A | 5/2021 |
| CN | 113438508 | A | 9/2021 |
| CN | 113473002 | A | 10/2021 |
| CN | 113691758 | A | 11/2021 |
| CN | 114286007 | A | 4/2022 |
| WO | 2021051995 | A1 | 3/2021 |

* cited by examiner

1X 1.6X

PREVIEW IMAGE PROCESSING CIRCUIT, IMAGE PROCESSING METHOD, ELECTRONIC DEVICE, AND NON-TRANSITORY READABLE STORAGE MEDIUM

CROSS-REFERENCE TO RELATED APPLICATIONS

This application is a Bypass Continuation Application of International Patent Application No. PCT/CN2022/142852 filed Dec. 28, 2022, and claims priority to Chinese Patent Application No. 202111638522.0 filed Dec. 28, 2021, the disclosures of which are hereby incorporated by reference in their entireties.

BACKGROUND OF THE INVENTION

Field of the Invention

This application pertains to the field of communication technologies, and particularly, relates to an image processing circuit, an image processing method, an electronic device, and a non-transitory readable storage medium.

Description of Related Art

Currently, in a camera preview process, a user may adjust a zoom ratio of a preview image by sliding on a screen. However, when the zoom ratio of the preview image rapidly changes, jump of a focal length of the preview image is extremely large, which affects user experience.

SUMMARY OF THE INVENTION

According to a first aspect, an embodiment of this application provides an image processing circuit, including a main control chip and an image processing chip, where the main control chip is connected to the image processing chip;

- the main control chip is configured to: in a case that a display screen receives a first input performed by a user for a first preview image, obtain a second preview image, and send the second preview image to the image processing chip;
- the image processing chip is configured to generate a frame interpolation preview image based on the first preview image and the second preview image; and
- the image processing chip is further configured to sequentially output the frame interpolation preview image and the second preview image to the display screen for display, or the image processing chip is further configured to send the frame interpolation preview image and the second preview image to the main control chip, so that the main control chip sequentially outputs the frame interpolation preview image and the second preview image to the display screen for display.

According to a second aspect, an embodiment of this application provides an electronic device, including a display screen and an image processing circuit according to the first aspect, where the image processing circuit is connected to the display screen.

According to a third aspect, an embodiment of this application provides an image processing method, applied to the image processing circuit according to the first aspect, where the method includes:

- in a case that a display screen receives a first input performed by a user for a first preview image, obtaining, by the main control chip, a second preview image, and sending the second preview image to the image processing chip;
- generating, by the image processing chip, a frame interpolation preview image based on the first preview image and the second preview image; and
- sequentially outputting, by the image processing chip, the frame interpolation preview image and the second preview image to the display screen for display, or sending, by the image processing chip, the frame interpolation preview image and the second preview image to the main control chip, so that the main control chip sequentially outputs the frame interpolation preview image and the second preview image to the display screen for display.

According to a fourth aspect, an embodiment of this application provides an electronic device, where the electronic device includes a processor and a memory, the memory stores a program or an instruction stored in the memory and executable on the processor, and when the program or the instruction is executed by the processor, steps of the method according to the third aspect are implemented.

According to a fifth aspect, an embodiment of this application provides a non-transitory readable storage medium, where the non-transitory readable storage medium stores a program or an instruction, and when the program or the instruction is executed by a processor, steps of the method according to the third aspect are implemented.

According to a sixth aspect, an embodiment of this application provides a chip, where the chip includes a processor and a communication interface, the communication interface is coupled to the processor, and the processor is configured to run a program or an instruction to implement the method according to the third aspect.

According to a seventh aspect, an embodiment of this application provides a computer program product. The program product is stored in a non-transitory storage medium, and the program product is executed by at least one processor to implement the method according to the third aspect.

DESCRIPTION OF THE INVENTION

Figure 1:
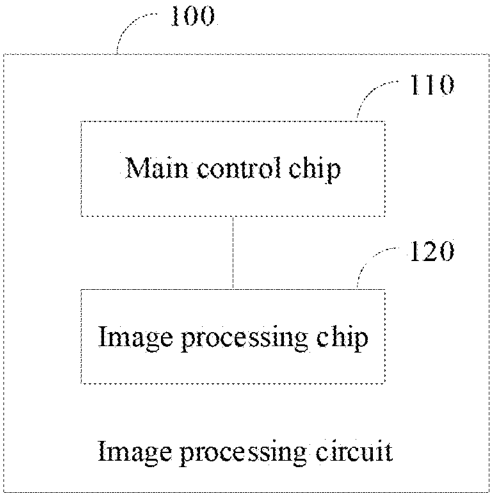
FIG. 1 is a first schematic diagram of a structure of an image processing apparatus according to an embodiment of this application.

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms such as "first" and "second" are used for distinguishing similar objects, and are not necessarily used to describe a particular order or sequence. It should be understood that data used in such a way are interchangeable in proper circumstances, so that the embodiments of this application can be implemented in an order other than the order illustrated or described herein. Objects classified by "first", "second", and the like are usually of a same type, and a quantity of objects is not limited. For example, there may be one or more first objects. In addition, in this specification and the claims, "and/or" represents at least one of connected objects, and a character "/" generally represents an "or" relationship between associated objects.

Usually, when a user rapidly slides a screen, a zoom ratio of a preview image rapidly changes. When camera switching is involved, for example, a wide-angle camera is switched to a main camera or a main camera is switched to a long-focal-length camera, a deviation of images output by different cameras may be calculated by using a spatial alignment transform (SAT) algorithm, so that the preview image is smoothly displayed through spatial alignment, thereby reducing the sense of strangeness. However, when the SAT algorithm switches between zoom ratios of different cameras, the SAT algorithm controls a plurality of cameras to be enabled at the same time, resulting in an increase in overall power consumption of a camera of an electronic device and system heat, which affects user experience.

To resolve the foregoing problem, an embodiment of this application provides an image processing circuit. When an image parameter of a preview image jumps significantly, an image processing chip performs frame interpolation processing on images output by different cameras, to generate a new preview image, so as to slow down and compensate for mismatch caused by jump. Compared with a case that a main control chip performs frame interpolation by using a SAT algorithm, a frame interpolation speed can be accelerated, and a response speed of an electronic device in a camera preview process is increased. In addition, the SAT algorithm in the main control chip does not need to be processed, and power consumption of the device can be reduced.

With reference to the accompanying drawings, an image processing circuit provided in embodiments of this application is described in detail below by using some embodiments and an application scenario thereof.

FIG. 1 shows an image processing circuit according to an embodiment of this application. The image processing circuit 100 includes a main control chip 110 and an image processing chip 120, and the main control chip 110 is connected to the image processing chip 120.

The main control chip 110 is configured to: in a case that a display screen receives a first input performed by a user for a first preview image, obtain a second preview image, and send the second preview image to the image processing chip 120.

In this embodiment, the main control chip 110 may be an application processor (AP). For example, the main control chip 110 is a system on chip (SoC), which is also referred to as an on-chip system, and is an integrated circuit with a dedicated target. The main control chip 110 includes a complete system and all content of embedded software.

In this embodiment, the first preview image may be a preview image currently displayed on a display screen of an electronic device. The second preview image may be a preview image updated in response to the first input of the user. In addition, the second preview image is a to-be-displayed preview image; in other words, the second preview image is an image that is not transmitted to the display screen. For example, the first preview image may be an image displayed on a photographing preview interface when a camera application is opened. For example, a zoom ratio of the first preview image is 1×. The second preview image may be an image obtained after the user zooms in the first preview image. For example, a zoom ratio of the second preview image is 1.6×.

In this embodiment, the first input may be an input for adjusting the zoom ratio of the first preview image. For example, the first input may be a tapping input for a target region, or a voice command entered by the user, or a specific gesture entered by the user, which can be determined according to actual use requirements and is not limited in this embodiment of this application. It should be noted herein that the specific gesture in this embodiment of this application may be any one of a tap gesture, a slide gesture, a drag gesture, a pressure recognition gesture, a touch and hold gesture, an area change gesture, a double-touch gesture, or a double-tap gesture. The tap input in this embodiment of this application may be a single-tap input, a double-tap input, a tap input for any quantity of times, or the like, or may be alternatively a touch and hold input or a touch input.

For example, the first input may be an input that the user zooms out the first preview image by using two fingers. For another example, the first input may be an input that the user selects a zoom ratio. For another example, the first input may be an input performed by the user for an adjustment control of a zoom ratio of the photographing preview interface. For another example, the first input may be an input for switching a photographing mode, for example, switching from "normal photographing mode" to "portrait photographing mode".

The image processing chip 120 is configured to generate a frame interpolation preview image based on the first preview image and the second preview image.

In this embodiment, the image processing chip may be configured to perform enhancement processing on an image collected by a camera. For example, the enhancement processing on the image may include enhancement processing on a preview image. Optionally, the enhancement processing may include frame interpolation processing. Optionally, the enhancement processing may further include image processing such as highlight, dynamic range improving, noise reduction, super resolution, sharpening, clipping, and color correction, and this is not limited in this embodiment of this application. The image processing chip further includes a dynamic random access memory (DRAM), configured to store an image. The image processing chip may be an independent display chip disposed in the electronic device.

In some embodiments, the image processing chip 120 is configured to: in a case that a variation amplitude of an image parameter of the second preview image relative to an image parameter of the first preview image meets a preset condition, generate the frame interpolation preview image based on the first preview image and the second preview image.

In this embodiment, when a zoom ratio of the preview image rapidly changes, a field of view of the preview image jumps significantly, and consequently, switching between two successive frames of preview images is extremely abrupt. In addition, when 3A information of the preview image greatly jumps, switching between two successive frames of preview images is extremely abrupt. For example, when automatic exposure and the automatic white balance information jump significantly, brightness of two successive frames of preview images change significantly. For another example, during automatic focusing, a preview image changes from blur to clarity, resolution changes significantly, and switching between two successive frames of preview images is abrupt. Based on this, whether a frame needs to be interpolated between the first preview image and the second preview image may be determined based on the variation amplitude of the image parameter of the second preview image relative to the image parameter of the first preview image meets the preset condition. When the frame needs to be interpolated, the frame interpolation preview image is generated between the first preview image and the second preview image, so that the preview image is displayed smoother.

The image parameter may be a field of view (FOV) and 3A information of the preview image. The 3A information may include automatic focusing (AF), automatic exposure (AE), and automatic white balance (AWB) information. Optionally, the image parameter includes at least one of the following: a field of view, color, brightness, or resolution.

In this embodiment, the preset condition may be a condition for determining whether a frame interpolation image needs to be generated. The preset condition may include at least one of a field of view condition, a color condition, a brightness condition, or a resolution condition. The field of view condition may be that a change value of a field of view of the second preview image relative to a field of view of the first preview image is greater than a field of view change threshold. The brightness condition may be that a difference between brightness of the second preview image and brightness of the first preview image is greater than a brightness change threshold. The resolution condition may be that a difference between resolution of the second preview image and resolution of the first preview image may be greater than a resolution change threshold.

For example, the generating the frame interpolation preview image between the first preview image and the second preview image may be generating one frame of frame interpolation preview image between the first preview image and the second preview image. For example, a zoom ratio of the first preview image is 1×, a zoom ratio of the second preview image is 1.6×, and one frame of image whose zoom ratio is 1.3× may be generated between the first preview image and the second preview image. For example, the generating the frame interpolation preview image between the first preview image and the second preview image may be generating a plurality of frames of frame interpolation preview images between the first preview image and the second preview image. For example, a zoom ratio of the first preview image is 1×, a zoom ratio of the second preview image is 5×, and a series of images, that is, images corresponding to 2.0×, 3.0×, and 4.0×, may be generated between the first preview image and the second preview image.

In this embodiment, in a case that the variation amplitude of the image parameter of the second preview image relative to the image parameter of the first preview image meets the preset condition, the image processing chip generates the frame interpolation preview image based on the first preview image and the second preview image, so that display of the preview image is smoother, and power consumption of the device can be reduced.

In this embodiment, after the image processing chip 120 generates the frame interpolation preview image based on the first preview image and the second preview image, the image processing chip 120 is further configured to output the frame interpolation preview image and the second preview image to the display screen for display. Some embodiments are used below for description.

In some optional embodiments, the image processing chip 120 is further configured to sequentially output the frame interpolation preview image and the second preview image to the display screen for display.

For example, in a case that the display screen receives the first input performed by the user for the first preview image, the main control chip obtains a second preview image collected by the camera, and transmits the second preview image to the image processing chip, and the image processing chip receives and stores the second preview image. Then, the image processing chip generates the frame interpolation preview image between the first preview image and the second preview image. Then, the image processing chip sequentially transmits the frame interpolation preview image and the second preview image to the display screen for display, that is, the display screen sequentially displays the frame interpolation preview image and the second preview image.

In this embodiment, after the image processing chip generates the frame interpolation preview image based on the first preview image and the second preview image, the image processing chip sequentially transmits the frame interpolation preview image and the second preview image to the display screen for display, and does not need to return the preview image to the main control chip, thereby shortening time of image transmission, and making update of the preview image more fluent.

In some other optional embodiments, the image processing chip 120 is further configured to send the frame interpolation preview image and the second preview image to the main control chip 110, so that the main control chip 110 sequentially outputs the frame interpolation preview image and the second preview image to the display screen for display.

For example, in a case that the display screen receives the first input performed by the user for the first preview image, the main control chip obtains a second preview image collected by the camera, and transmits the second preview image to the image processing chip, and the image processing chip receives and stores the second preview image. Then, the image processing chip generates the frame interpolation preview image between the first preview image and the second preview image. Then, the image processing chip sequentially returns the frame interpolation preview image and the second preview image to the main control chip, and the main control chip sequentially transmits the frame interpolation preview image and the second preview image to the display screen for display, that is, the display screen sequentially displays the frame interpolation preview image and the second preview image.

In this embodiment, after generating the frame interpolation preview image based on the first preview image and the second preview image, the image processing chip sequentially transmits the frame interpolation preview image and the second preview image to the main control chip, and the main control chip transmits the frame interpolation preview image and the second preview image to the display screen for display. Only the image processing chip needs to be added to the electronic device to slow down and compensate for mismatch caused by jump, so that display of the preview image is smoother.

In this embodiment of this application, the image processing circuit includes the main control chip and the image processing chip. The main control chip is configured to: in a case that the display screen receives the first input performed by the user for the first preview image, obtain the second preview image, and send the second preview image to the image processing chip; the image processing chip is configured to generate the frame interpolation preview image based on the first preview image and the second preview image; and the image processing chip is further configured to sequentially output the frame interpolation preview image and the second preview image to the display screen for display, or the image processing chip is further configured to send the frame interpolation preview image and the second preview image to the main control chip, so that the main control chip sequentially outputs the frame interpolation preview image and the second preview image to the display screen for display. In this way, when a displayed preview image is updated, the frame interpolation preview image is generated by the image processing chip, so that mismatch caused by jump can be slowed down and compensated for, and therefore, display of the preview image is smoother. In addition, compared with a case that the main control chip performs image processing by using a SAT algorithm, the image processing chip has a faster processing speed, so that a frame interpolation speed can be accelerated, a response speed in a zooming process can be increased, and user experience is better. In addition, in this embodiment, the preview image does not need to be processed by the main control chip by using the SAT algorithm, so that power consumption of the main control chip can be reduced. In addition, time of dual-opening and multiple-opening of the camera of the electronic device can be reduced, and power consumption of the electronic device can be reduced.

In some embodiments, before the display screen receives the first input performed by the user for the first preview image, the main control chip 110 is further configured to obtain the first preview image and output the first preview image to the display screen for display.

For example, when a camera application is opened, the camera of the electronic device collects the first preview image, converts the collected first preview image into a digital signal, that is, a digital image, and transmits the digital image obtained through conversion to the main control chip of the electronic device, and the main control chip transmits the first preview image to the display screen, so that the display screen displays the first preview image.

In some embodiments, the main control chip 110 is further configured to obtain a preview image and send the first preview image to the image processing chip 120, and the image processing chip 120 is further configured to output the first preview image to the display screen for display.

For example, when the camera application is opened, the camera of the electronic device collects the first preview image, converts the collected first preview image into a digital signal, that is, a digital image, and then transmits the digital image obtained through conversion to the main control chip of the electronic device; the main control chip transmits the first preview image to the image processing chip; and the image processing chip stores the first preview image, and transmits the first preview image to the display screen, so that the display screen displays the first preview image.

In this embodiment, after the main control chip obtains the first preview image, the main control chip sends the first preview image to the image processing chip, and the image processing chip sequentially transmits the first preview image to the display screen for display, and does not need to return the preview image to the main control chip, so that time for image transmission can be shortened, and update of the preview image is more fluent. In addition, power consumption of the main control chip can be reduced.

In some embodiments, the image processing chip 120 is further configured to: in a case that a variation amplitude of an image parameter of the second preview image relative to an image parameter of the first preview image does not meet a preset condition, output the second preview image to the display screen for display.

In this embodiment, the image parameter includes at least one of the following: a field of view, color, brightness, or resolution. That the variation amplitude of the image parameter of the second preview image relative to the image parameter of the first preview image does not meet the preset condition may be that a variation value of a field of view of the second preview image relative to a field of view of the first preview image is not greater than a field of view variation threshold, or a difference between brightness of the second preview image relative to brightness of the first preview image is not greater than a brightness variation threshold, or a difference between resolution of the second preview image relative to resolution of the first preview image is not greater than a resolution variation threshold.

For example, when a zoom ratio of the preview image remains unchanged, the second preview image is directly transmitted to the display screen for display. For example, when a zoom ratio of the preview image remains unchanged, the main control chip transmits the second preview image to the display screen for display. For another example, when a zoom ratio of the preview image remains unchanged, the image processing chip receives and stores the second preview image sent by the main control chip, and transmits the second preview image to the display screen for display.

In this embodiment, in a case that an image parameter of the preview image jumps significantly, the frame interpolation preview image is generated between the first preview image and the second preview image, and the frame interpolation preview image and the second preview image are sequentially transmitted to the display screen for display, and in a case that an image parameter of the preview image does not jump significantly, the second preview image is directly transmitted to the display screen for display. In this way, a corresponding manner may be selected based on an actual requirement of the user to update a displayed preview image, so that a camera preview process is smoother.

In some embodiments, the image processing chip is further configured to update the second preview image to the first preview image frame.

In this embodiment, the first frame of preview image may be a preview image currently displayed on the display screen. After the frame interpolation preview image and the second preview image are sequentially displayed on the display screen, the image processing chip updates the second preview image to the first frame preview image. In this way, when the user adjusts the zoom ratio of the preview image again, it may be determined, based on the updated first frame preview image, whether frame interpolation processing needs to be performed, thereby ensuring smooth running of the camera preview process.

Figure 2:
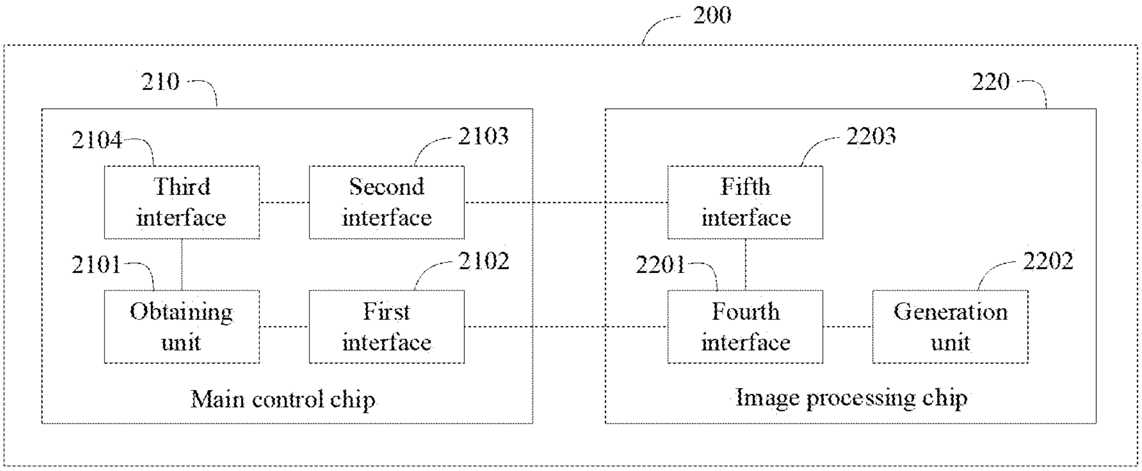
FIG. 2 is a second schematic diagram of a structure of an image processing apparatus according to an embodiment of this application.

FIG. 2 shows another image processing circuit according to an embodiment of this application. The image processing circuit 200 includes a main control chip 210 and an image processing chip 220. The main control chip 210 includes an obtaining unit 2101, a first interface 2102, a second interface 2103, and a third interface 2104. The image processing chip 220 includes a fourth interface 2201, a generation unit 2202, and a fifth interface 2203.

The obtaining unit 2101 is configured to obtain a second preview image in a case that a display screen receives a first input performed by a user for a first preview image. The first interface 2102 is connected to the obtaining unit 2101, and the first interface 2102 is configured to send the second preview image. The fourth interface 2201 is connected to the first interface 2102, and the generation unit 2202 is separately connected to the fourth interface 2201 and the fifth interface 2203. The generation unit 2202 is configured to: receive the second preview image through the fourth interface 2201, generate a frame interpolation preview image based on the first preview image and the second preview image, and send the frame interpolation preview image and the second preview image to the main control chip 210 through the fifth interface 2203. The second interface 2103 is configured to receive the frame interpolation preview image and the second preview image. The third interface 2104 is connected to the second interface 2103, and the third interface 2104 is configured to sequentially output the frame interpolation preview image and the second preview image to the display screen for display.

In this embodiment, the first interface 2102 may be a mobile industry processor interface-transmit interface (MIPI TX). The second interface 2103 may be a mobile industry processor interface-receive interface (MIPI RX). The third interface 2104 may be a MIPI display interface (DSI). The fourth interface 2201 may be a MIPI RX receive interface. The fifth interface 2203 may be a MIPI TX transmit interface.

An example in which a zoom ratio of a preview image rapidly changes is used below for description. When a camera application program is opened, the obtaining unit 2101 of the main control chip 210 collects, by using a MIPI CSI interface, a first preview image (a zoom ratio is 1×) photographed by the camera, and the main control chip 210 transmits the first preview image to the display screen for display through the third interface 2104. In addition, the main control chip 210 sends the first preview image to the image processing chip 220 through the first interface 2102, and the image processing chip 220 receives the first preview image through the fourth interface 2201. Then, when the first input performed by the user for the first preview image is received, a zoom ratio of the preview image rapidly changes. For example, the zoom ratio of the preview image rapidly changes to 1.6× when the user rapidly slides a photographing preview interface by using two fingers. In this case, the obtaining unit 2101 of the main control chip 210 collects, by using the MIPI CSI interface, a second preview image (a zoom ratio is 1.6×) photographed by the camera, and sends the second preview image to the image processing chip 220 through the first interface 2102. Then, the image processing chip 220 receives the second preview image through the fourth interface 2201, and the generation unit 2202 of the image processing chip 220 generates a frame interpolation preview image (a zoom ratio is 1.3×) between the first preview image and the second preview image. Then, the image processing chip 220 sequentially sends the frame interpolation preview image and the second preview image through the fifth interface 2203. Then, the main control chip 210 receives the frame interpolation preview image and the second preview image through the second interface 2103, and sequentially transmits the frame interpolation preview image and the second preview image to the display screen for display through the third interface 2104, that is, the display screen sequentially displays the frame interpolation preview image and the second preview image.

In this embodiment of this application, when a displayed preview image is updated, the frame interpolation preview image is generated by the image processing chip, so that mismatch caused by jump can be slowed down and compensated for, and therefore, display of the preview image is smoother. In addition, compared with a case that the main control chip performs image processing by using a SAT algorithm, the image processing chip has a faster processing speed, so that a frame interpolation speed can be accelerated, a response speed in a zooming process can be increased, and user experience is better. In addition, in this embodiment, the preview image does not need to be processed by the main control chip by using the SAT algorithm, so that power consumption of the main control chip can be reduced. In addition, time of dual-opening and multiple-opening of the camera of the electronic device can be reduced, and power consumption of the electronic device can be reduced.

Figure 3:
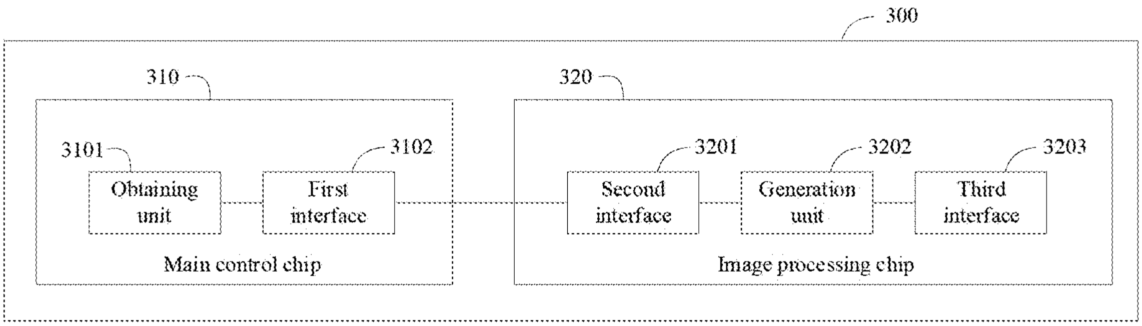
FIG. 3 is a third schematic diagram of a structure of an image processing apparatus according to an embodiment of this application.

FIG. 3 shows another image processing circuit according to an embodiment of this application. The image processing circuit 300 includes a main control chip 310 and an image processing chip 320. The main control chip 310 includes an obtaining unit 3101 and a first interface 3102. The image processing chip 320 includes a second interface 3201, a generation unit 3202, and a third interface 3203.

The obtaining unit 3101 is configured to obtain a second preview image in a case that a display screen receives a first input performed by a user for a first preview image. The first interface 3102 is connected to the obtaining unit 3101, and the first interface 3102 is configured to send the second preview image. The second interface 3201 is connected to the first interface 3102, and the second interface 3201 is configured to receive the second preview image. The generation unit 3202 is separately connected to the second interface 3201 and the third interface 3203, and the generation unit 3202 is configured to: generate a frame interpolation preview image based on the first preview image and the second preview image, and sequentially output the frame interpolation preview image and the second preview image to the display screen for display through the third interface 3203.

In this embodiment, the first interface 3102 may be a MIPI TX transmit interface. The second interface 3201 may be a MIPI RX receive interface. The third interface 3203 may be a MIPI display interface.

An example in which a zoom ratio of a preview image rapidly changes is still used below for description. When a camera application program is opened, the obtaining unit 3101 of the main control chip 310 collects, by using a MIPI CSI interface, a first preview image (a zoom ratio is 1×) photographed by a camera, the main control chip 310 sends the first preview image to the image processing chip 320 through the first interface 3102, and the image processing chip 320 receives the first preview image through the second interface 3201, and transmits the first preview image to the display screen for display through the third interface 3203. Then, when the first input performed by the user for the first preview image is received, a zoom ratio of the preview image rapidly changes. For example, the zoom ratio of the preview image rapidly changes to 1.6× when the user rapidly slides a photographing preview interface by using two fingers. In this case, the obtaining unit 3101 of the main control chip 310 collects, by using the MIPI CSI interface, a second preview image (a zoom ratio is 1.6×) photographed by the camera, and sends the second preview image to the image processing chip 220 through the first interface 3102. Then, the image processing chip 320 receives the second preview image through the second interface 3201, and the generation unit 3202 of the image processing chip 320 generates a frame interpolation preview image (a zoom ratio is 1.3×) between the first preview image and the second preview image. Then, the image processing chip 320 sequentially transmits the frame interpolation preview image and the second preview image to the display screen for display through the third interface 3203, that is, the display screen sequentially displays the frame interpolation preview image and the second preview image.

In this embodiment, when a displayed preview image is updated, the frame interpolation preview image is generated by the image processing chip, so that mismatch caused by jump can be slowed down and compensated for, and therefore, display of the preview image is smoother. In addition, compared with a case that the main control chip performs image processing by using a SAT algorithm, the image processing chip has a faster processing speed, so that a frame interpolation speed can be accelerated, a response speed in a zooming process can be increased, and user experience is better. In addition, the image processing chip sequentially transmits the frame interpolation preview image and the second preview image to the display screen for display, and does not need to return the preview image to the main control chip, so that time of image transmission can be shortened, and update of the preview image is smoother.

Figure 4:
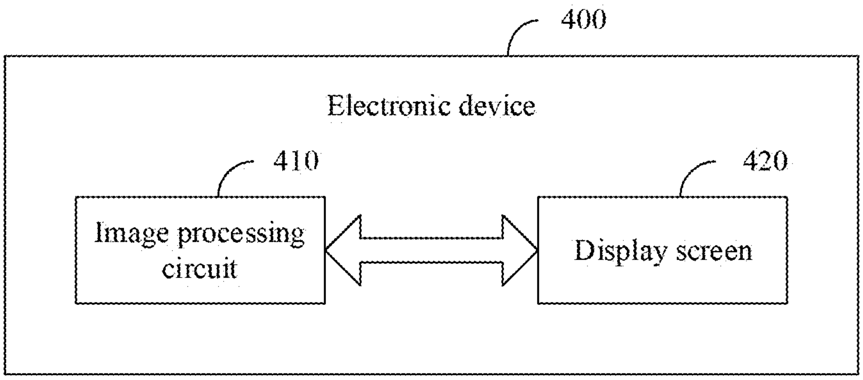
FIG. 4 is a schematic diagram of a structure of an electronic device according to an embodiment of this application.

Based on the foregoing content, an embodiment further provides an electronic device. As shown in FIG. 4, the electronic device 400 includes a display screen 410 and an image processing circuit 420, and the display screen 410 is connected to the image processing circuit 420.

In this embodiment, the image processing circuit 420 may be the image processing circuit 200 shown in FIG. 2, or the image processing circuit 420 may be the image processing circuit 300 shown in FIG. 3.

Figure 5:
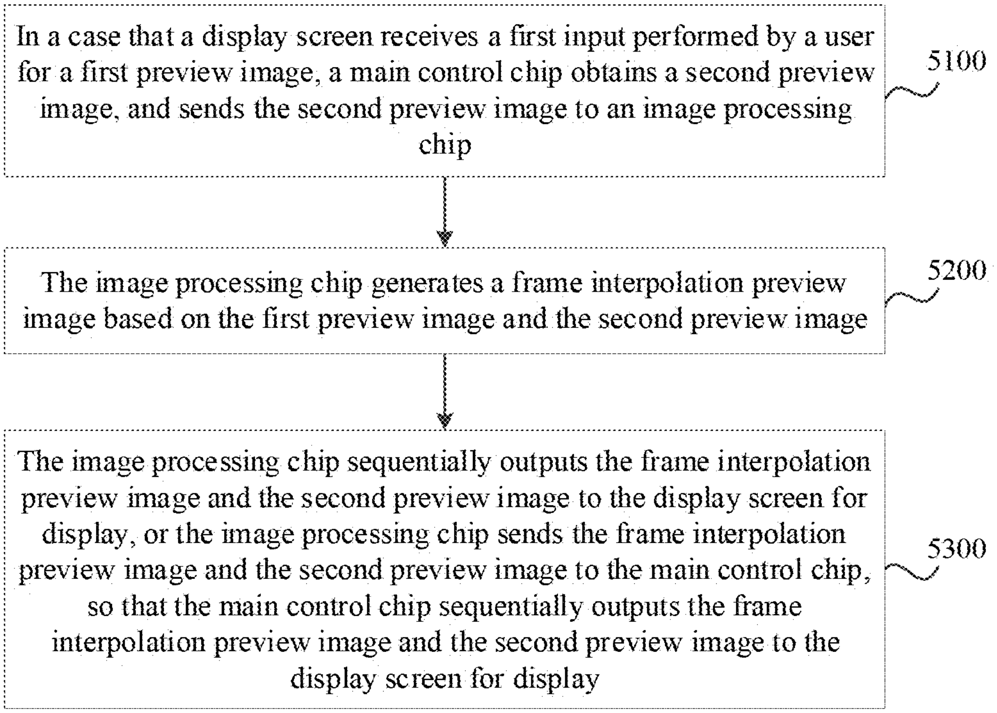
FIG. 5 is a flowchart of an image processing method according to an embodiment of this application.

FIG. 5 is a flowchart of an image processing method according to an embodiment of the present application. The method may be applied to the image processing circuit according to any embodiment of this application. As shown in FIG. 5, the method may include step S100 to step S300. Detailed descriptions are provided below.

Step S100: In a case that a display screen receives a first input performed by a user for a first preview image, a main control chip obtains a second preview image, and sends the second preview image to an image processing chip.

In this embodiment, the main control chip may be an AP chip. For example, the main control chip is an SoC chip, which is also referred to as an on-chip system, and is an integrated circuit with a dedicated target. The main control chip includes a complete system and all content of embedded software.

Figure 6:
FIG. 6 is a schematic diagram of a first preview image according to an embodiment of this application.
Figure 7:
FIG. 7 is a schematic diagram of a second preview image according to an embodiment of this application.

In this embodiment, the first preview image may be a preview image currently displayed on a display screen of an electronic device. The second preview image may be a preview image updated in response to the first input of the user. In addition, the second preview image is a to-be-displayed preview image; in other words, the second preview image is an image that is not transmitted to the display screen. For example, the first preview image may be an image displayed on a photographing preview interface when a camera application is opened. For example, as shown in FIG. 6, a zoom ratio of the first preview image is 1×. The second preview image may be an image obtained after the user zooms in the first preview image. For example, as shown in FIG. 7, a zoom ratio of the second preview image is 1.6×.

In this embodiment, the first input may be an input for adjusting the zoom ratio of the first preview image. For example, the first input may be a tapping input for a target region, or a voice command entered by the user, or a specific gesture entered by the user, which can be determined according to actual use requirements and is not limited in this embodiment of this application. It should be noted herein that the specific gesture in this embodiment of this application may be any one of a tap gesture, a slide gesture, a drag gesture, a pressure recognition gesture, a touch and hold gesture, an area change gesture, a double-touch gesture, or a double-tap gesture. The tap input in this embodiment of this application may be a single-tap input, a double-tap input, a tap input for any quantity of times, or the like, or may be alternatively a touch and hold input or a touch input.

For example, the first input may be an input that the user zooms out the first preview image by using two fingers. For another example, the first input may be an input that the user selects a zoom ratio. For another example, the first input may be an input performed by the user for an adjustment control of a zoom ratio of the photographing preview interface. For another example, the first input may be an input for switching a photographing mode, for example, switching from “normal photographing mode” to “portrait photographing mode”.

In some embodiments, before the main control chip obtains the second preview image in a case that the first input performed by the user for the first preview image is received, the method may further include: obtaining, by the main control chip, the first preview image, and outputting the first preview image to the display screen for display.

During implementation, when a camera application is opened, the camera of the electronic device collects the first preview image, converts the collected first preview image into a digital signal, that is, a digital image, and transmits the digital image obtained through conversion to the main control chip of the electronic device, and the main control chip transmits the first preview image to the display screen, so that the display screen displays the first preview image.

In some embodiments, before the main control chip obtains the second preview image in a case that the first input performed by the user for the first preview image is received, the method may further include: obtaining, by the main control chip, the first preview image, and sending the first preview image to the image processing chip; and outputting, by the image processing chip, the first preview image to the display screen for display.

During implementation, when the camera application is opened, the camera of the electronic device collects the first preview image, converts the collected first preview image into a digital signal, that is, a digital image, and then transmits the digital image obtained through conversion to the main control chip of the electronic device; the main control chip transmits the first preview image to the image processing chip; and the image processing chip stores the first preview image, and transmits the first preview image to the display screen, so that the display screen displays the first preview image.

In this embodiment, after the main control chip obtains the first preview image, the main control chip sends the first preview image to the image processing chip, and the image processing chip sequentially transmits the first preview image to the display screen for display, and does not need to return the preview image to the main control chip, so that time for image transmission can be shortened, and update of the preview image is more fluent. In addition, power consumption of the main control chip can be reduced.

In some embodiments of this application, before the first input performed by the user for the first preview image is received, the method may further include: receiving and storing, by the image processing chip, the first preview image. During implementation, when the camera application is opened, the camera of the electronic device collects the first preview image, converts the collected first preview image into a digital signal, that is, a digital image, and then transmits the digital image obtained through conversion to the main control chip of the electronic device through a MIPI CSI interface; the main control chip transmits the first preview image to the image processing chip through a MIPI TX transmit interface; and the image processing chip stores the first preview image.

After step S100, step S200 is performed: The image processing chip generates a frame interpolation preview image based on the first preview image and the second preview image.

In this embodiment, the image processing chip may be configured to perform enhancement processing on an image collected by a camera. For example, the enhancement processing on the image may include enhancement processing on a preview image. Optionally, the enhancement processing may include frame interpolation processing. Optionally, the enhancement processing may further include image processing such as highlight, dynamic range improving, noise reduction, super resolution, sharpening, clipping, and color correction, and this is not limited in this embodiment of this application. The image processing chip further includes a dynamic random access memory DRAM, configured to store an image. The image processing chip may be an independent display chip disposed in the electronic device.

In some embodiments, the generating, by the image processing chip, a frame interpolation preview image based on the first preview image and the second preview image may include: in a case that a variation amplitude of an image parameter of the second preview image relative to an image parameter of the first preview image meets a preset condition, generating, by the image processing chip, the frame interpolation preview image based on the first preview image and the second preview image.

In this embodiment, when a zoom ratio of the preview image rapidly changes, a field of view of the preview image jumps significantly, and consequently, switching between two successive frames of preview images is extremely abrupt. In addition, when 3A information of the preview image greatly jumps, switching between two successive frames of preview images is extremely abrupt. For example, when automatic exposure and the automatic white balance information jump significantly, brightness of two successive frames of preview images change significantly. For another example, during automatic focusing, a preview image changes from blur to clarity, resolution changes significantly, and switching between two successive frames of preview images is abrupt. Based on this, whether a frame needs to be interpolated between the first preview image and the second preview image may be determined based on the variation amplitude of the image parameter of the second preview image relative to the image parameter of the first preview image meets the preset condition. When the frame needs to be interpolated, the frame interpolation preview image is generated between the first preview image and the second preview image, so that the preview image is displayed smoother.

The image parameter may be a field of view (FOV) and 3A information of the preview image. The 3A information may include automatic focusing (AF), automatic exposure (AE), and automatic white balance (AWB) information. Optionally, the image parameter includes at least one of the following: a field of view, color, brightness, or resolution.

In this embodiment, the preset condition may be a condition for determining whether a frame interpolation image needs to be generated. The preset condition may include at least one of a field of view condition, a color condition, a brightness condition, or a resolution condition. The field of view condition may be that a change value of a field of view of the second preview image relative to a field of view of the first preview image is greater than a field of view change threshold. The brightness condition may be that a difference between brightness of the second preview image and brightness of the first preview image is greater than a brightness change threshold. The resolution condition may be that a difference between resolution of the second preview image and resolution of the first preview image may be greater than a resolution change threshold.

During implementation, the generating the frame interpolation preview image between the first preview image and the second preview image may be generating one frame of frame interpolation preview image between the first preview image and the second preview image. For example, a zoom ratio of the first preview image is 1×, a zoom ratio of the second preview image is 1.6×, and one frame of image whose zoom ratio is 1.3× may be generated between the first preview image and the second preview image. For example, the generating the frame interpolation preview image between the first preview image and the second preview image may be generating a plurality of frames of frame interpolation preview images between the first preview image and the second preview image. For example, a zoom ratio of the first preview image is 1×, a zoom ratio of the second preview image is 5×, and a series of images, that is, images corresponding to 2.0×, 3.0×, and 4.0×, may be generated between the first preview image and the second preview image.

In this embodiment, in a case that the variation amplitude of the image parameter of the second preview image relative to the image parameter of the first preview image meets the preset condition, the image processing chip generates the frame interpolation preview image based on the first preview image and the second preview image, so that display of the preview image is smoother, and power consumption of the device can be reduced.

After step S200, step S300 is performed: The image processing chip sequentially outputs the frame interpolation preview image and the second preview image to the display screen for display, or the image processing chip sends the frame interpolation preview image and the second preview image to the main control chip, so that the main control chip sequentially outputs the frame interpolation preview image and the second preview image to the display screen for display.

The two manners are described below by using some examples.

Figure 8:
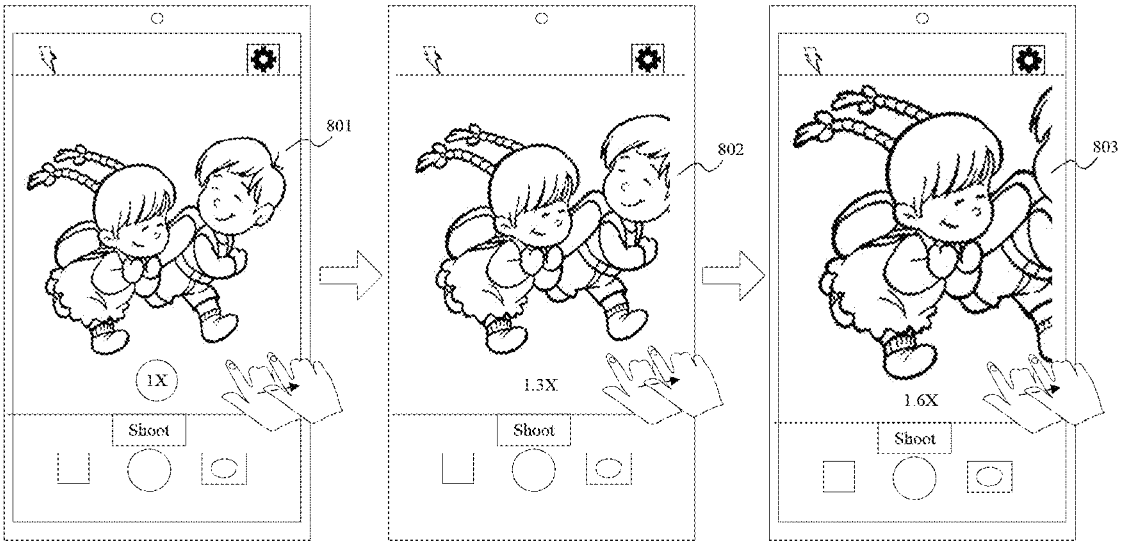
FIG. 8 is a schematic diagram of a photographing preview interface according to an embodiment of this application.

For example, as shown in FIG. 8, when a camera application is opened, a camera of an electronic device collects a first preview image, and displays the first preview image 801 (a zoom ratio is 1×) on the display screen. In addition, the main control chip transmits the first preview image to the image processing chip, and the image processing chip receives and stores the first preview image. Then, when the display screen receives a first input performed by the user for the first preview image 801, the zoom ratio of the preview image rapidly changes. For example, the zoom ratio of the preview image rapidly changes to 1.6× when the user rapidly slides a photographing preview interface by using two fingers. In this case, the main control chip obtains a second preview image (a zoom ratio is 1.6×) collected by the camera. Then, the main control chip transmits the second preview image to the image processing chip, and the image processing chip receives and stores the second preview image. Then, the image processing chip generates a frame interpolation preview image (a zoom ratio is 1.3×) between the first preview image and the second preview image, and sequentially transmits the frame interpolation preview image and the second preview image to the display screen for display, that is, the display screen sequentially displays the frame interpolation preview image 802 and the second preview image 803.

In this embodiment, after the image processing chip generates the frame interpolation preview image based on the first preview image and the second preview image, the image processing chip sequentially transmits the frame interpolation preview image and the second preview image to the display screen for display, and does not need to return the preview image to the main control chip, thereby shortening time of image transmission, and making update of the preview image more fluent.

For example, still as shown in FIG. 8, when a camera application is opened, a camera of an electronic device collects a first preview image, and displays the first preview image 801 (a zoom ratio is 1×) on the display screen. In addition, the main control chip transmits the first preview image to the image processing chip, and the image processing chip receives and stores the first preview image. Then, when the display screen receives a first input performed by the user for the first preview image 801, the zoom ratio of the preview image rapidly changes. For example, the zoom ratio of the preview image rapidly changes to 1.6× when the user rapidly slides a photographing preview interface by using two fingers. In this case, the main control chip obtains a second preview image (a zoom ratio is 1.6×) collected by the camera. Then, the main control chip transmits the second preview image to the image processing chip, and the image processing chip receives and stores the second preview image. Then, the image processing chip generates a frame interpolation preview image (a zoom ratio is 1.3×) between the first preview image and the second preview image, and returns the frame interpolation preview image and the second preview image to the main control chip. Then, the main control chip sequentially transmits the frame preview image 802 and the second preview image 803 to the display screen for display, that is, the display screen sequentially displays the frame preview image 802 and the second preview image 803.

In this embodiment, after generating the frame interpolation preview image based on the first preview image and the second preview image, the image processing chip sequentially transmits the frame interpolation preview image and the second preview image to the main control chip, and the main control chip transmits the frame interpolation preview image and the second preview image to the display screen for display. Only the image processing chip needs to be added to the electronic device to slow down and compensate for mismatch caused by jump, so that display of the preview image is smoother.

In this embodiment of this application, in a case that the display screen receives the first input performed by the user for the first preview image, the main control chip obtains the second preview image, and sends the second preview image to the image processing chip; the image processing chip generates the frame interpolation preview image based on the first preview image and the second preview image; and the image processing chip sequentially outputs the frame interpolation preview image and the second preview image to the display screen for display, or the image processing chip sends the frame interpolation preview image and the second preview image to the main control chip, so that the main control chip sequentially outputs the frame interpolation preview image and the second preview image to the display screen for display. In this way, when a displayed preview image is updated, the frame interpolation preview image is generated by the image processing chip, so that mismatch caused by jump can be slowed down and compensated for, and therefore, display of the preview image is smoother. In addition, compared with a case that the main control chip performs image processing by using a SAT algorithm, the image processing chip has a faster processing speed, so that a frame interpolation speed can be accelerated, a response speed in a zooming process can be increased, and user experience is better. In addition, in this embodiment, the preview image does not need to be processed by the main control chip by using the SAT algorithm, so that power consumption of the main control chip can be reduced. In addition, time of dual-opening and multiple-opening of the camera of the electronic device can be reduced, and power consumption of the electronic device can be reduced.

In some embodiments, after the sending the second preview image to the image processing chip, the method may further include: in a case that a variation amplitude of an image parameter of the second preview image relative to an image parameter the first preview image does not meet a preset condition, outputting, by the image processing chip, the second preview image to the display screen for display.

In this embodiment, the image parameter includes at least one of the following: a field of view, color, brightness, or resolution. That the variation amplitude of the image parameter of the second preview image relative to the image parameter of the first preview image does not meet the preset condition may be that a variation value of a field of view of the second preview image relative to a field of view of the first preview image is not greater than a field of view variation threshold, or a difference between brightness of the second preview image relative to brightness of the first preview image is not greater than a brightness variation threshold, or a difference between resolution of the second preview image relative to resolution of the first preview image is not greater than a resolution variation threshold.

For example, when a zoom ratio of the preview image remains unchanged, the second preview image is directly transmitted to the display screen for display. For example, when a zoom ratio of the preview image remains unchanged, the main control chip transmits the second preview image to the display screen for display. For another example, when a zoom ratio of the preview image remains unchanged, the image processing chip receives and stores the second preview image sent by the main control chip, and transmits the second preview image to the display screen for display.

In this embodiment, in a case that an image parameter of the preview image jumps significantly, the frame interpolation preview image is generated between the first preview image and the second preview image, and the frame interpolation preview image and the second preview image are sequentially transmitted to the display screen for display, and in a case that an image parameter of the preview image does not jump significantly, the second preview image is directly transmitted to the display screen for display. In this way, a corresponding manner may be selected based on an actual requirement of the user to update a displayed preview image, so that a camera preview process is smoother.

In some embodiments, after the image processing chip sends the frame interpolation preview image and the second preview image, the method may further include: updating, by the image processing chip, the second preview image to the first frame preview image.

In this embodiment, the first frame of preview image may be a preview image currently displayed on the display screen. After the frame interpolation preview image and the second preview image are sequentially displayed on the display screen, the image processing chip updates the second preview image to the first frame preview image. In this way, when the user adjusts the zoom ratio of the preview image again, it may be determined, based on the updated first frame preview image, whether frame interpolation processing needs to be performed, thereby ensuring smooth running of the camera preview process.

The image processing circuit in this embodiment of this application may be an electronic device, or may be a component such as an integrated circuit or a chip in the electronic device. The electronic device may be a terminal, or another device other than the terminal. For example, the electronic device may be a mobile phone, a tablet computer, a notebook computer, a palmtop computer, a vehicle-mounted electronic device, a mobile Internet device (MID), an augmented reality (AR)/virtual reality (VR) device, a robot, a wearable device, an ultra-mobile personal computer (UMPC), a netbook, a personal digital assistant (PDA), or the like. The electronic device may be alternatively a server, a network attached storage (NAS), a personal computer (PC), a television (TV), a teller machine, a self-service machine, or the like. This is not limited in this embodiment of this application.

The electronic device in this embodiment of this application may be an apparatus with an operating system. The operating system may be an Android operating system, may be an iOS operating system, or may be another possible operating system. This is not limited in this embodiment of this application.

The electronic device provided in this embodiment of this application can implement processes implemented by the electronic device in the method embodiment of FIG. 5. To avoid repetition, details are not described herein again.

Figure 9:
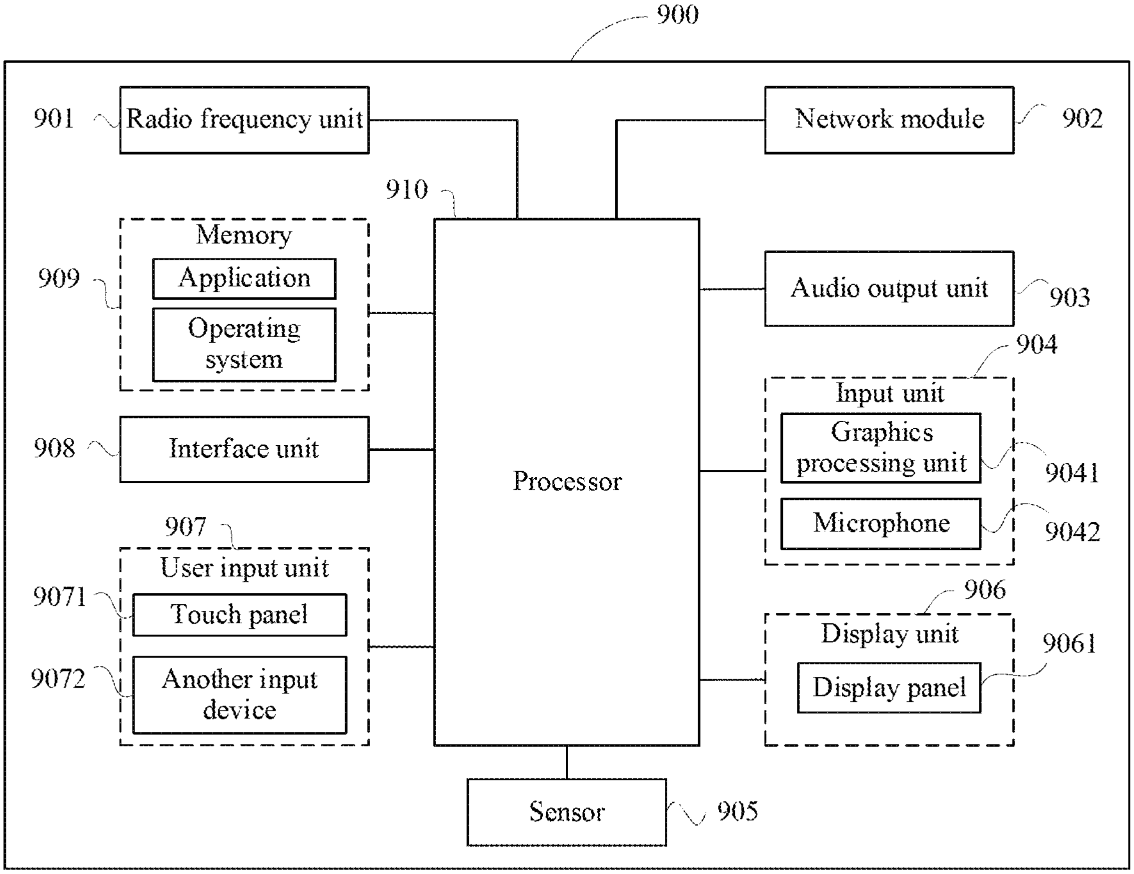
FIG. 9 is a schematic diagram of a hardware structure of an electronic device for implementing embodiments of this application.

FIG. 9 is a schematic diagram of a hardware structure of an electronic device according to an embodiment of this application.

An electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

Optionally, the electronic device 900 may further include an image processing chip. Optionally, the processor 910 may implement functions of the foregoing main control chip and the foregoing image processing chip.

A person skilled in the art can understand that the electronic device 900 may further include a power supply (such as a battery) that supplies power to each component. The power supply may be logically connected to the processor 910 by using a power supply management system, to implement functions such as charging and discharging management, and power consumption management by using the power supply management system. The structure of the electronic device shown in FIG. 9 does not constitute a limitation on the electronic device. The electronic device may include components more or fewer than those shown in the diagram, a combination of some components, or different component arrangements. Details are not described herein again.

The processor 910 is configured to: in a case that a first input performed by a user for a first preview image is received, obtain a second preview image, and send the second preview image to an image processing chip.

The image processing chip is configured to generate a frame interpolation preview image based on the first preview image and the second preview image.

The image processing chip is configured to sequentially output the frame interpolation preview image and the second preview image to the display unit 906 for display, or the image processing chip is further configured to send the frame interpolation preview image and the second preview image to the processor 910, so that the processor 910 sequentially outputs the frame interpolation preview image and the second preview image to the display unit 906 for display.

Optionally, the image processing chip is configured to: in a case that a variation amplitude of an image parameter of the second preview image relative to an image parameter of the first preview image meets a preset condition, generate the frame interpolation preview image based on the first preview image and the second preview image.

Optionally, the image processing chip is further configured to: in a case that a variation amplitude of an image parameter of the second preview image relative to an image parameter of the first preview image does not meet a preset condition, output the second preview image to the display unit 906 for display.

Optionally, the image parameter includes at least one of the following: a field of view, color, brightness, or resolution.

Optionally, before the processor 910 obtains the second preview image in a case that the first input performed by the user for the first preview image is received, the processor 910 is further configured to obtain the first preview image and output the first preview image to the display unit 906 for display.

Optionally, before obtaining the second preview image in a case that the first input performed by the user for the first preview image is received, the processor 910 is further configured to obtain the first preview image and send the first preview image to the image processing chip, and the image processing chip is further configured to output the first preview image to the display unit 906 for display.

In the embodiments of this application, in a case that the first input performed by the user for the first preview image is received, the processor obtains the second preview image, and sends the second preview image to the image processing chip; the image processing chip generates the frame interpolation preview image based on the first preview image and the second preview image; and the image processing chip sequentially outputs the frame interpolation preview image and the second preview image to the display unit for display, or the image processing chip sends the frame interpolation preview image and the second preview image to the processor, so that the processor sequentially outputs the frame interpolation preview image and the second preview image to the display unit for display. In this way, when a displayed preview image is updated, the frame interpolation preview image is generated by the image processing chip, so that mismatch caused by jump can be slowed down and compensated for, and therefore, display of the preview image is smoother. In addition, compared with a case that a main control chip performs image processing by using a SAT algorithm, the image processing chip has a faster processing speed, so that a frame interpolation speed can be accelerated, a response speed in a zooming process can be increased, and user experience is better. In addition, in this embodiment, the preview image does not need to be processed by the main control chip by using the SAT algorithm, so that power consumption of the main control chip can be reduced. In addition, time of dual-opening and multiple-opening of the camera of the electronic device can be reduced, and power consumption of the electronic device can be reduced.

It should be understood that in this embodiment of this application, the input unit 904 may include a graphics processing unit (GPU) 9041 and a microphone 9042. The graphics processing unit 9041 processes image data of a static picture or a video obtained by an image capture apparatus (for example, a camera) in a video capture mode or an image capture mode. The display unit 906 may include a display panel 9061. Optionally, the display panel 9061 may be configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein again.

The memory 909 may be configured to store a software program and various data. The memory 909 may mainly include a first storage area for storing a program or an instruction and a second storage area for storing data. The first storage area may store an operating system, and an application or an instruction required by at least one function (for example, a sound playing function or an image playing function). In addition, the memory 909 may be a volatile memory or a nonvolatile memory, or the memory 909 may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synch link dynamic random access memory (SLDRAM), and a direct rambus random access memory (DRRAM). The memory 909 in this embodiment of this application includes but is not limited to these memories and any memory of another proper type.

The processor 910 may include one or more processing units. Optionally, an application processor and a modem processor are integrated into the processor 910. The application processor mainly processes an operating system, a user interface, an application, or the like. The modem processor mainly processes a wireless communication signal, for example, a baseband processor. It may be understood that, the modem processor may alternatively not be integrated into the processor 910.

An embodiment of this application further provides a non-transitory readable storage medium. The non-transitory readable storage medium stores a program or an instruction, and the program or the instruction is executed by a processor to implement the processes of the foregoing embodiment of the image processing method, and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory ROM, a random access memory RAM, a magnetic disk, or an optical disc.

An embodiment of this application further provides a chip. The chip includes a processor and a communication interface, the communication interface is coupled to the processor, and the processor is configured to run a program or an instruction to implement the processes of the foregoing embodiment of the image processing method, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The program product is stored in a non-transitory storage medium, and the program product is executed by at least one processor to implement the processes of the foregoing embodiment of the image processing method, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the foregoing implementations, and the foregoing implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. An image processing circuit, comprising a main control chip and an image processing chip, wherein the main control chip is connected to the image processing chip;

the main control chip is configured to: in a case that a display screen receives a first input performed by a user for a first preview image, obtain a second preview image, and send the second preview image to the image processing chip;

the image processing chip is configured to generate a frame interpolation preview image based on the first preview image and the second preview image; and the image processing chip is further configured to sequentially output the frame interpolation preview image and the second preview image to the display screen for display; or the image processing chip is further configured to send the frame interpolation preview image and the second preview image to the main control chip, so that the main control chip sequentially outputs the frame interpolation preview image and the second preview image to the display screen for display;

wherein the image processing chip is further configured to: in a case that a variation amplitude of an image parameter of the second preview image relative to an image parameter of the first preview image does not meet a preset condition, output the second preview image to the display screen for display.

2. The image processing circuit according to claim 1, wherein the image processing chip is further configured to: in a case that a variation amplitude of an image parameter of the second preview image relative to an image parameter of the first preview image meets a preset condition, generate the frame interpolation preview image based on the first preview image and the second preview image.

3. The image processing circuit according to claim 1, wherein the image parameter comprises at least one of the following: a field of view, color, brightness, or resolution.

4. The image processing circuit according to claim 1, wherein the main control chip is further configured to obtain the first preview image and output the first preview image to the display screen for display.

5. The image processing circuit according to claim 1, wherein the main control chip is further configured to obtain the first preview image and send the first preview image to the image processing chip; and the image processing chip is further configured to output the first preview image to the display screen for display.

6. An electronic device, comprising a display screen and the image processing circuit according to claim 1, wherein the image processing circuit is connected to the display screen.

7. An image processing method, performed by an image processing circuit, wherein the image processing circuit comprises a main control chip and an image processing chip, and the main control chip is connected to the image processing chip; and the method comprises:

in a case that a display screen receives a first input performed by a user for a first preview image, obtaining, by the main control chip, a second preview image, and sending the second preview image to the image processing chip;

generating, by the image processing chip, a frame interpolation preview image based on the first preview image and the second preview image; and sequentially outputting, by the image processing chip, the frame interpolation preview image and the second preview image to the display screen for display; or sending, by the image processing chip, the frame interpolation preview image and the second preview image to the main control chip, so that the main control chip sequentially outputs the frame interpolation preview image and the second preview image to the display screen for display;

wherein after the sending the second preview image to the image processing chip, the method further comprises:

in a case that a variation amplitude of an image parameter of the second preview image relative to an image parameter of the first preview image does not meet a preset condition, outputting, by the image processing chip, the second preview image to the display screen for display.

8. The image processing method according to claim 7, wherein the generating, by the image processing chip, a frame interpolation preview image based on the first preview image and the second preview image further comprises:

in a case that a variation amplitude of an image parameter of the second preview image relative to an image parameter of the first preview image meets a preset condition, generating, by the image processing chip, the frame interpolation preview image based on the first preview image and the second preview image.

9. The image processing method according to claim 8, wherein the image parameter comprises at least one of the following: a field of view, color, brightness, or resolution.

10. The image processing method according to claim 7, wherein before the obtaining, by the main control chip, a second preview image in a case that a first input performed by a user for a first preview image is received, the method further comprises:

obtaining, by the main control chip, the first preview image, and outputting the first preview image to the display screen for display.

11. The image processing method according to claim 7, wherein before the obtaining, by the main control chip, a second preview image in a case that a first input performed by a user for a first preview image is received, the method further comprises:

obtaining, by the main control chip, the first preview image, and sending the first preview image to the image processing chip; and outputting, by the image processing chip, the first preview image to the display screen for display.

12. An electronic device, comprising a main control chip and an image processing chip, the main control chip being connected to the image processing chip;

wherein the electronic device further comprises a processor and a memory storing a program or an instruction executable on the processor, and when the program or the instruction is executed by the processor, the following steps are implemented:

in a case that a display screen receives a first input performed by a user for a first preview image, obtaining, by the main control chip, a second preview image, and sending the second preview image to the image processing chip;

generating, by the image processing chip, a frame interpolation preview image based on the first preview image and the second preview image; and sequentially outputting, by the image processing chip, the frame interpolation preview image and the second preview image to the display screen for display; or sending, by the image processing chip, the frame interpolation preview image and the second preview image to the main control chip, so that the main control chip sequentially outputs the frame interpolation preview image and the second preview image to the display screen for display;

wherein when the program or the instruction is executed by the processor, the following step is further implemented:

in a case that a variation amplitude of an image parameter of the second preview image relative to an image parameter of the first preview image does not meet a preset condition, outputting, by the image processing chip, the second preview image to the display screen for display.

13. The electronic device according to claim 12, wherein when the program or the instruction is executed by the processor, the following step is further implemented:

in a case that a variation amplitude of an image parameter of the second preview image relative to an image parameter of the first preview image meets a preset condition, generating, by the image processing chip, the frame interpolation preview image based on the first preview image and the second preview image.

14. The electronic device according to claim 12, wherein the image parameter comprises at least one of the following: a field of view, color, brightness, or resolution.

15. The electronic device according to claim 12, wherein when the program or the instruction is executed by the processor, the following steps are further implemented:

obtaining, by the main control chip, the first preview image, and outputting the first preview image to the display screen for display.

16. The electronic device according to claim 12, wherein when the program or the instruction is executed by the processor, the following steps are further implemented:

obtaining, by the main control chip, the first preview image, and sending the first preview image to the image processing chip; and outputting, by the image processing chip, the first preview image to the display screen for display.

17. A non-transitory readable storage medium, wherein the non-transitory readable storage medium stores a program or an instruction, and when the program or the instruction is executed by a processor, steps of the image processing method according to claim 7 are implemented.

* * * * *